(12) United States Patent
Kim

(10) Patent No.: US 7,489,373 B2
(45) Date of Patent: Feb. 10, 2009

(54) PRISM SHEET AND LIQUID CRYSTAL DISPLAY HAVING THE SAME

(75) Inventor: Yong-Ii Kim, Yong-si (KR)

(73) Assignee: Samsung Electronics Co., Ltd. (KR)

( * ) Notice: Subject to any disclaimer, the term of this patent is extended or adjusted under 35 U.S.C. 154(b) by 121 days.

(21) Appl. No.: 10/394,533

(22) Filed: Mar. 21, 2003

(65) Prior Publication Data

US 2003/0234900 A1 Dec. 25, 2003

(30) Foreign Application Priority Data

Jun. 12, 2002 (KR) .............................. 2002-33028

(51) Int. Cl.
*G02F 1/1335* (2006.01)
(52) U.S. Cl. ............................ 349/64; 349/62; 359/599
(58) Field of Classification Search ................ 349/112, 349/61–66; 362/26, 31; 359/599
See application file for complete search history.

(56) References Cited

U.S. PATENT DOCUMENTS 5,206,746 A * 4/1993 Ooi et al. ..................... 349/62
5,572,411 A * 11/1996 Watai et al. ................... 362/31
6,129,439 A * 10/2000 Hou et al. .................... 362/626
6,600,528 B2 * 7/2003 Colgan et al. ................. 349/95
6,661,479 B2 * 12/2003 Taniguchi et al. ............. 349/65
6,665,029 B2 * 12/2003 Kondo et al. ................ 349/113
6,981,792 B2 * 1/2006 Nagakubo et al. ........... 362/600

FOREIGN PATENT DOCUMENTS

JP 09-005505 1/1997
JP 2000-231103 8/2000

* cited by examiner

*Primary Examiner*—Dung T. Nguyen
(74) *Attorney, Agent, or Firm*—Alma P. Levy; MacPherson Kwok Chen & Heid LLP

(57) ABSTRACT

A prism sheet that allows light that is incident with an angle below 2.8° with respect to an axis normal to a light incident surface to be refracted and emitted, and a liquid crystal display device including the prism sheet are presented. The prism sheet includes a first surface through which light from a light source enters the prism sheet and a second surface through which the light exits the prism sheet. The second surface also includes polygonal protruding members having length axes substantially parallel to each other. Each of the polygonal protruding members has at least one first side forming an angle ranging from 65° to 75° with respect to a line normal to the first surface, and at least one second side forming an angle ranged from 40° to 50° with respect to a line normal to the first surface.

12 Claims, 14 Drawing Sheets

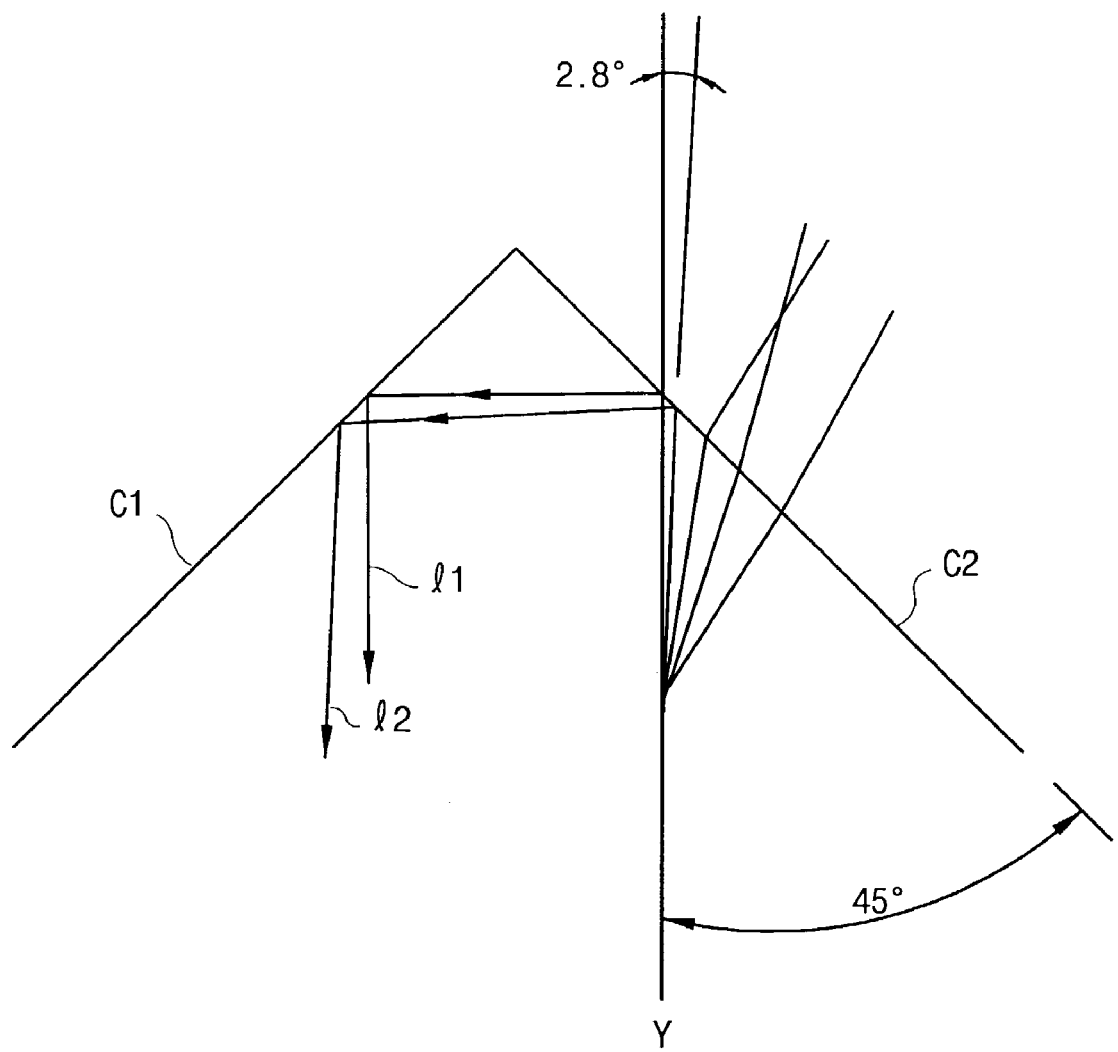

PRISM SHEET AND LIQUID CRYSTAL DISPLAY HAVING THE SAME

RELATED APPLICATION

This application claims priority from Korean Patent Application No. 2002-33028 filed on Jun. 12, 2002, which is incorporated herein in its entirety.

BACKGROUND OF THE INVENTION

1. Field of the Invention

The present invention relates to a prism sheet and more particularly to a prism sheet structure for enhancing light luminance and a liquid crystal display device that includes the prism sheet.

2. Description of the Related Art

Prism sheet is used in display devices. For instance, a prism sheet may be used with the backlight source for an LCD device, a luminance-enhancing film, a light-reflecting film, etc. A "prism sheet" commonly refers to a sheet including one surface that is made of a polyester film having adhesive property as the base film and an ultraviolet-hardened resin film laminated on the base film. The prism sheet is provided mainly to enhance the luminance of a light-emitting device (e.g., a liquid crystal display device) by narrowing the viewing angle of a light that has passed through the diffusion plate of the light-emitting device.

Various attempts have been made to enhance the luminance of liquid crystal displays ("LCD") device. Among these attempts, elevating the supply voltage has been proved to be an effective way to achieve the intended luminance enhancement. However, elevating the supply voltage requires an increased battery capacity which undesirably adds to the weight of the device and decreases battery life.

To this end, various methods for enhancing the luminance while lowering the supply voltage have been studied.

One of these methods, which is disclosed in U.S. Pat. No. 4,906,070, includes a thin flexible film made of a polymeric material including a structured surface and an opposite smooth surface. In the flexible film, the structured surface includes a linear array of miniature substantially right angled isosceles prisms arranged side-by-side to form a plurality of peaks and grooves. In addition, the perpendicular sides of the prisms make an angle of approximately 45°. However, this flexible film was proposed for internally reflecting light, and was not intended for application to an LCD device.

FIG. 1 is a perspective view of a right angled isosceles prism sheet 10 applied to a conventional LCD device. Referring to FIG. 1, right angled isosceles prisms 12 are arranged in parallel with each other in one direction (ex. X-direction) of a surface from which light is emitted. A surface placed adjacent to the surface on which the prisms are formed is a smooth plane 14. Each of the prisms include an incline plane C1 (see FIG. 2A below) of these prisms 12 that has an angle of approximately 45° with respect to a normal line (Y) perpendicular to this smooth plane 14.

As shown in FIG. 2A, if a light strikes a right incline plane C2 of the prism sheet from within an approximately 2.8° cone, wherein the 2.8° is measured with respect to the normal line (Y), this incident light is totally internally reflected as shown by paths of 1 and 2. This totally internally reflected light never escapes the prism and is lost.

Similarly, if a light strikes a left incline plane C1 of the prism sheet at an angle within an approximately 2.8° cone with respect to the normal line (Y), this incident light is totally internally reflected along paths 3 and 4. This light never escapes the prism and is lost.

The above two facts mean that if a light strikes a surface of a prism sheet at an angle that is less than 2.8°, light extraction efficiency is lowered. Consequently, the front luminance is lowered.

FIG. 3 is a view showing a measurement result of luminance distribution of light passing through the diffusion plate in a conventional LCD device, and FIG. 4 is a view showing a measurement result of luminance distribution of light passing through the prism sheet in the conventional LCD device.

Referring to FIG. 3, when a distribution of the luminance is measured with varying the viewing angle at a point on the diffusion sheet, a light amount of approximately 55.5% with respect to a total light amount is emitted at a viewing angle of approximately ±34° ("A"). This, as shown in FIG. 4, means that approximately 55.5% of the light that is incident at an incident angle of an approximately ±34° on the prism sheet is refracted or emitted toward the front side where an image is displayed.

Since light having an angle of incidence less than approximately 2.8° with respect to the normal line is not emitted, the amount of such light should be minimized to prevent the luminance from being lowered.

In order to prevent the luminance from being lowered, there were the following prior arts.

Japanese Patent Laid-Open Publication No. 8-320405 discloses a prism sheet and a back light without impairing front luminance as a back light and causing a bright and dark pattern by composing each prism surface of a wavy surface having a specified height difference for every prism unit. In this prism sheet, the prism surface of each prism unit is formed with a surface of waviness having a height difference (D) higher than 1 µm.

Japanese Laid-Open Publication No. 7-230002 discloses a directional back light which has its directivity improved. The transparent sheet is formed by arraying many shape units 8, each formed by connecting two convex curved columnar surfaces having generating lines parallel to each other in right-left symmetrical relation at right angles to the generating lines, on one surface, and the respective tangential surfaces and planes cross each other at a 180° angle.

Japanese Laid-Open Publication No. 6-250182 discloses a prism sheet that is used for enhancing the luminance and does not generate stripe patterns. In this prism sheet, many projecting parts are formed on the front surface of the prism sheet to be used by arranging the sheet on the exit surface side of the surface light source device and forming the entire part or a part of these projecting parts as an embossed surface.

Japanese Patent Laid Open Publication No. 8-254606 discloses a lens sheet enabling to eliminate unnecessary light of an incline direction without lowering the luminance in the normal direction. The lens sheet has a lens array layer in which a plurality of unit lens parts are arranged in one-dimension or two-dimension at the light exit side of a transparent base part and are formed in the form of a projecting shape on the light exit side. The section (main cut surface) of the one direction or the two directions orthogonal with each other is formed in a pentagonal shape. In such a case, the angle θ4 formed by the two sides on the base part side of the unit lens parts is steeper (θ3>θ4) than the angle (i.e., vertical angle) θ3 formed by the two sides on the vertex side.

While the aforementioned prior arts achieve the objects of preventing the occurrence of the stripe pattern and enhancing the luminance, they do not solve a problem related to utilization of the light that is incident with an angle below 2.8° with respect to the normal line perpendicular to the emitting plane. As described later, approximately 70% of the light that is incident on the prism sheet is incident with an angle below 50°. To this end, it is desirable to enhance the utilization efficiency of the light that is incident with the aforementioned angle below approximately 2.8° so as to increase the luminance.

SUMMARY OF THE INVENTION

Accordingly, the present invention is directed to a prism sheet and a liquid crystal display device having the same that substantially obviate one or more problems due to limitations and disadvantages of the related art.

It is a first object of the present invention to provide a prism sheet capable of preventing luminance from being lowered at a specific viewing angle.

It is a second object of the present invention to provide a prism sheet capable of enhancing a usage efficiency of incident light.

It is a third object of the present invention to provide a liquid crystal display device having a prism sheet capable of preventing luminance from being lowered at a specific viewing angle.

It is a fourth object of the present invention to provide a liquid crystal display device capable of enhancing a usage efficiency of incident light.

To achieve the first and second objects of the present invention, there is provided a prism sheet. The above prism sheet includes a first surface into which light is incident from a light source, and a second surface for emitting the light that is incident through the first surface. The second surface also includes a plurality of polygonal protruding members having length axes substantially parallel to each other.

Preferably, each of the polygonal protruding members has at least one first side forming an angle ranged from 65° to 75° with respect to a line normal to the first surface, and at least one second side forming an angle ranged from 40° to 50° with respect to a line normal to the first surface.

Alternatively, the first side is placed nearer the uppermost apex than the second side.

Alternatively, the second side is placed nearer the uppermost apex than the first side.

Preferably, a total length of the first side is greater than that of the second side.

Preferably, the polygonal protruding members are pentagonal pyramids.

To achieve the third and fourth objects, there is provided a liquid crystal display device. The liquid crystal display device includes: a diffusion plate for diffusing a light that is incident from a light source; a prism sheet for receiving the light that is incident from the diffusion plate; and an LCD panel for displaying an image using the light supplied from the prism sheet, wherein the prism sheet comprises a first surface into which light is incident from a light source, and a second surface for emitting the light that is incident through the first surface, and including a plurality of polygonal protruding members having length axes substantially parallel to each other.

Preferably, each of the polygonal protruding members has at least one first side forming an angle ranging from 65° to 75° with respect to a line normal to the first surface, and at least one second side forming an angle ranged from 40° to 50° with respect to a line normal to the first surface.

Alternatively, the first side is placed nearer the uppermost apex than the second side.

Alternatively, the second side is placed nearer the uppermost apex than the first side.

Preferably, a total length of the first side is greater than that of the second side.

BRIEF DESCRIPTION OF THE DRAWINGS

The above and other advantages of the present invention will become more apparent by describing in detail exemplary embodiments thereof with reference to the attached drawings in which:

FIGS. 2A and 2B are sectional views for illustrating operation of the prism sheet shown in FIG. 1, in particular, FIG. 2A is a conceptual scheme of when light is incident into left side of the section-shaped prism, and FIG. 2B is a conceptual scheme of when light is incident into right side of the section-shaped prism;

FIG. 10A is a conceptual view of when light is incident into left side of the section-shaped prism and FIG. 10B is a conceptual view of when light is incident into right side of the section-shaped prism;

DETAILED DESCRIPTION OF THE PREFERRED EMBODIMENTS

Now, exemplary embodiments of the present invention will be described in detail with reference to the annexed drawings.

Figure 5:
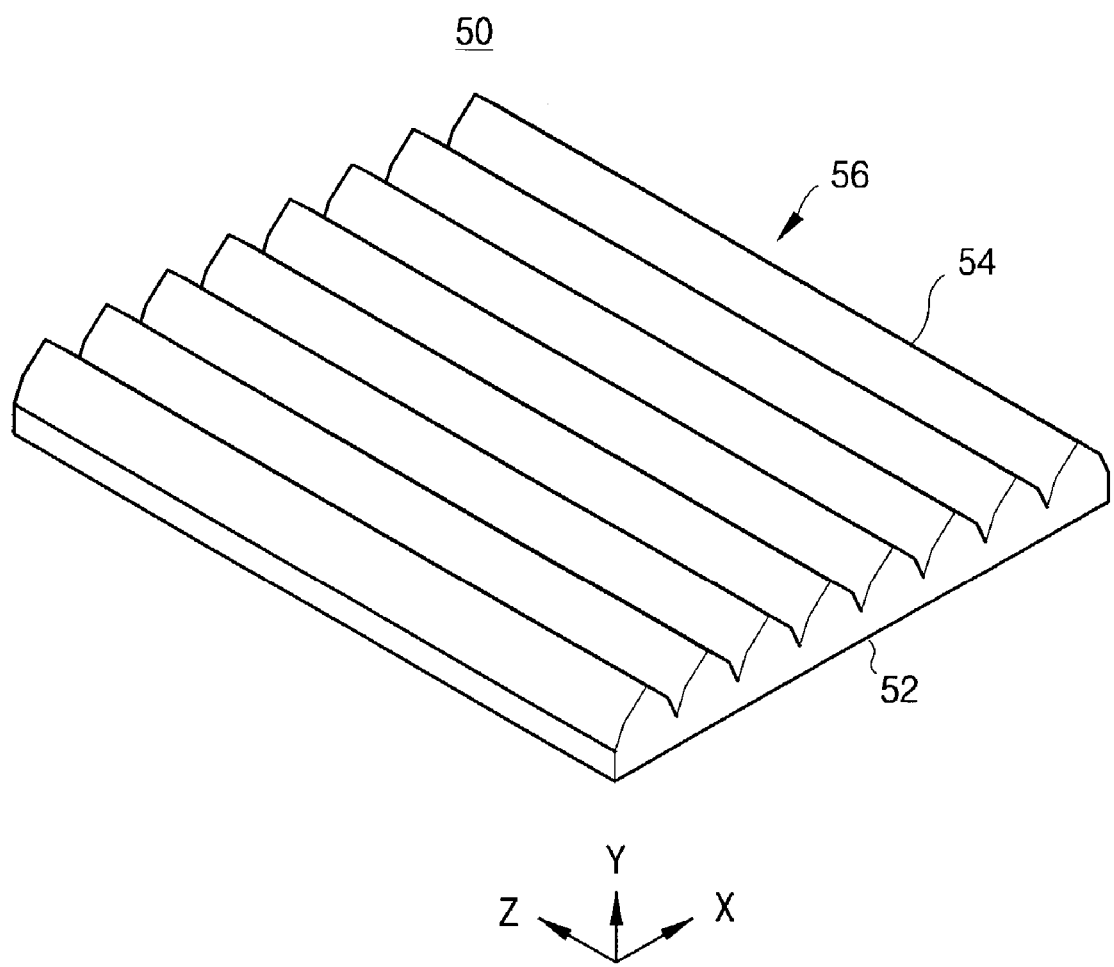
FIG. 5 is a perspective view of a prism sheet in accordance with one embodiment of the present invention.
Figure 6:
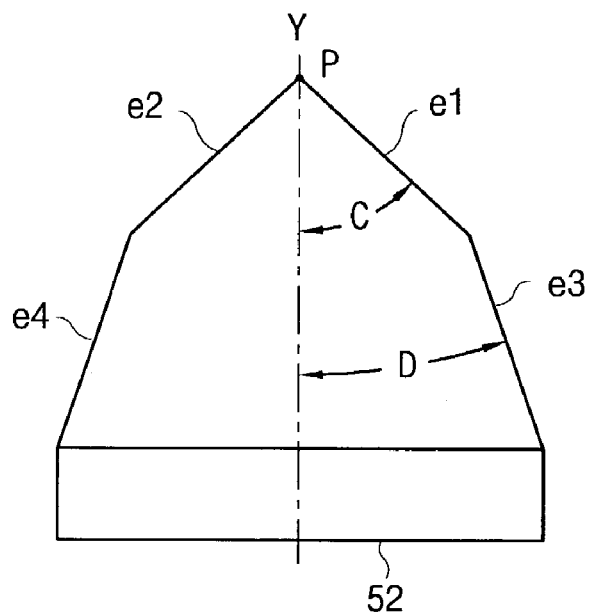
FIG. 6 is a sectional view of one protruding member in the prism sheet of FIG. 5.

FIG. 5 is a perspective view of a prism sheet in accordance with one embodiment of the present invention, and FIG. 6 is a sectional view of one protruding member in the prism sheet of FIG. 5. Referring to FIG. 5, a prism sheet 50 includes a first surface 52 through which light is incident, and a second surface 54 that is back to back with the first surface 52 and having a plurality of polygonal protruding members 56. The polygonal protruding members 56 are arranged substantially in parallel with each other in one direction (X-direction).

As shown in FIG. 6, the polygonal protruding members have a polygonal structure with at least five facets. The polygonal protruding members include a first side e1 and another first side e2 that come together to form an apex P. In FIG. 6, an angle (C) between the normal line Y of the first surface 52 and each of the first sides e1 and e2 ranges from 65° to 75° with respect to the normal line (Y) of the first surface 52, and is preferably about 70°. As aforementioned, these angles correspond to a range in which a light that strikes a surface of the respective protruding members at an angle below 2.8° with respect to the normal line is emitted, not totally internally reflected. Second sides e3 and e4 adjacent to the first sides e1 and e2 form an angle (D) that ranges from approximately 40° to 60° with respect to the normal line (Y) of the first surface. Light that is "emitted" escapes the prism or the protruding member.

Figure 7:
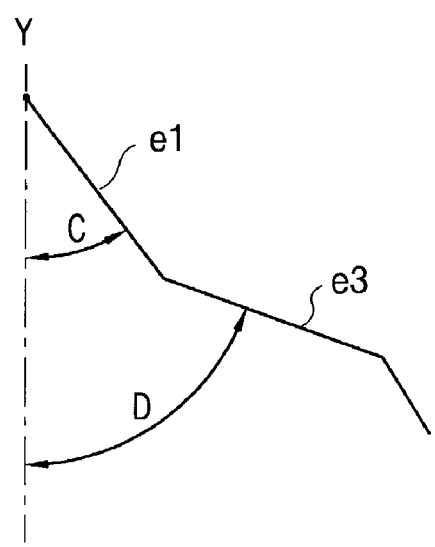
FIG. 7 is a view showing one example of a protruding member modified from FIG. 6.

FIG. 7 is a view showing one example of a protruding member modified from FIG. 6. In this example, the polygonal protruding member has more sides than a pentagon. Specifically, a first side e1 that is adjacent to the uppermost apex P has an angle C of approximately 40° to 60° with respect to the normal line (Y) of the first surface. As aforementioned, these angles correspond to a range in which a light that is incident onto the incline surfaces of the respective protruding members with an angle below 2.8° with respect to the normal line is emitted, not totally internally reflected. The second side (e3) adjacent to the first side (e1) has an angle (D) ranging from approximately 65° to 75°, and preferably about 70°, with respect to the normal line (Y) of the first surface.

Figure 8:
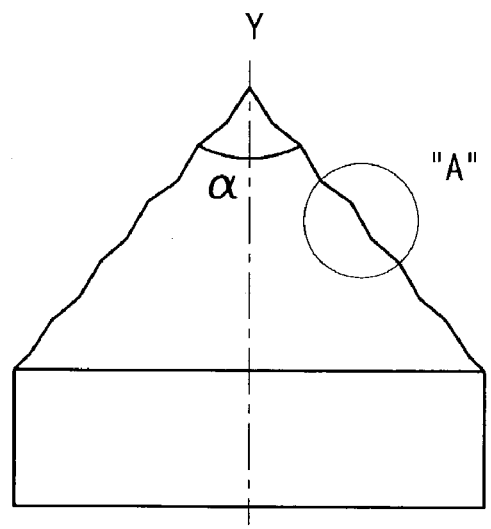
FIG. 8 is a sectional view of one protruding member in a prism sheet in accordance with another embodiment of the present invention.
Figure 9:
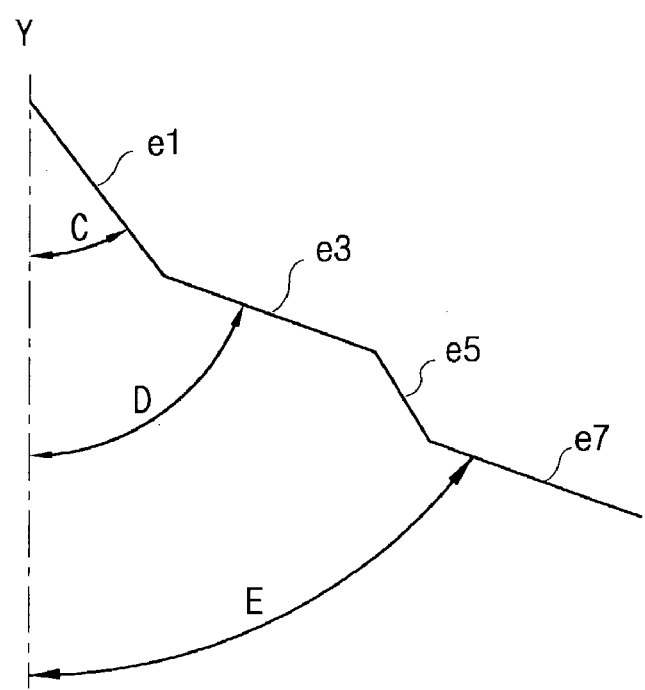
FIG. 9 is a detailed view of the portion "A" in FIG. 8.

FIG. 8 is a sectional view of one protruding member in a prism sheet in accordance with another embodiment of the present invention, and FIG. 9 is a detailed view of the portion "A" in FIG. 8. Referring to FIGS. 8 and 9, a protruding member of the present invention includes at least two sides (e3 and e7) having an angle (D, E) ranged from approximately 65° to 75° with respect to the normal line (Y), and these sides (e3 and e7) preferably form an angle of about 70°.

Likewise, these angles correspond to a range in which a light that is incident on the incline surfaces of the respective protruding members with an angle below 2.8° with respect to the normal line is emitted.

The protruding members provided in the above embodiments include at least one side which forms an angle ranging from 65° to 75° with respect to the normal line (Y) that is normal to the first surface. These angles correspond to a range in which light that is incident into the incline surfaces of the respective protruding members with an angle below 2.8° with respect to the normal line is emitted, thereby enhancing light extraction efficiency.

Figure 10A:
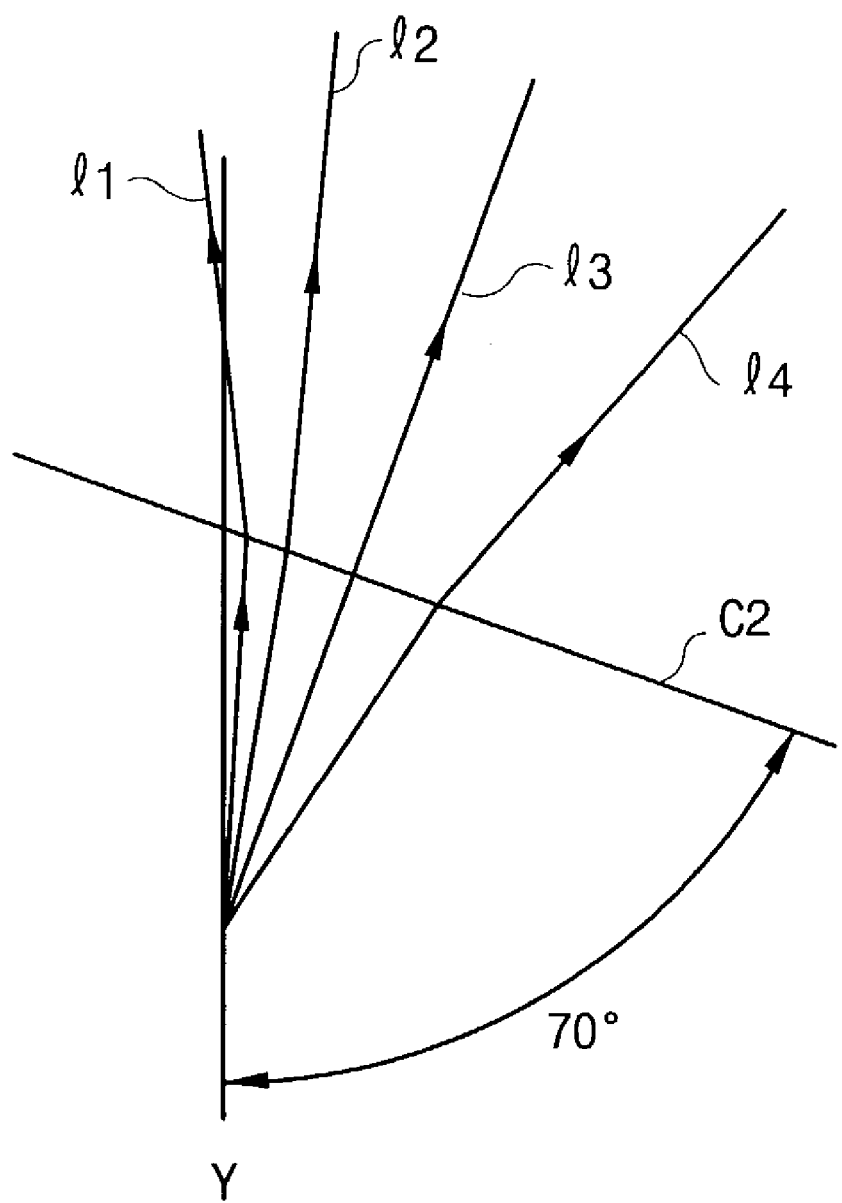
FIGS. 10A and 10B are sectional conceptual views for illustrating operations of the prism sheets shown in FIGS. 5 to 8, in particular
Figure 10B:
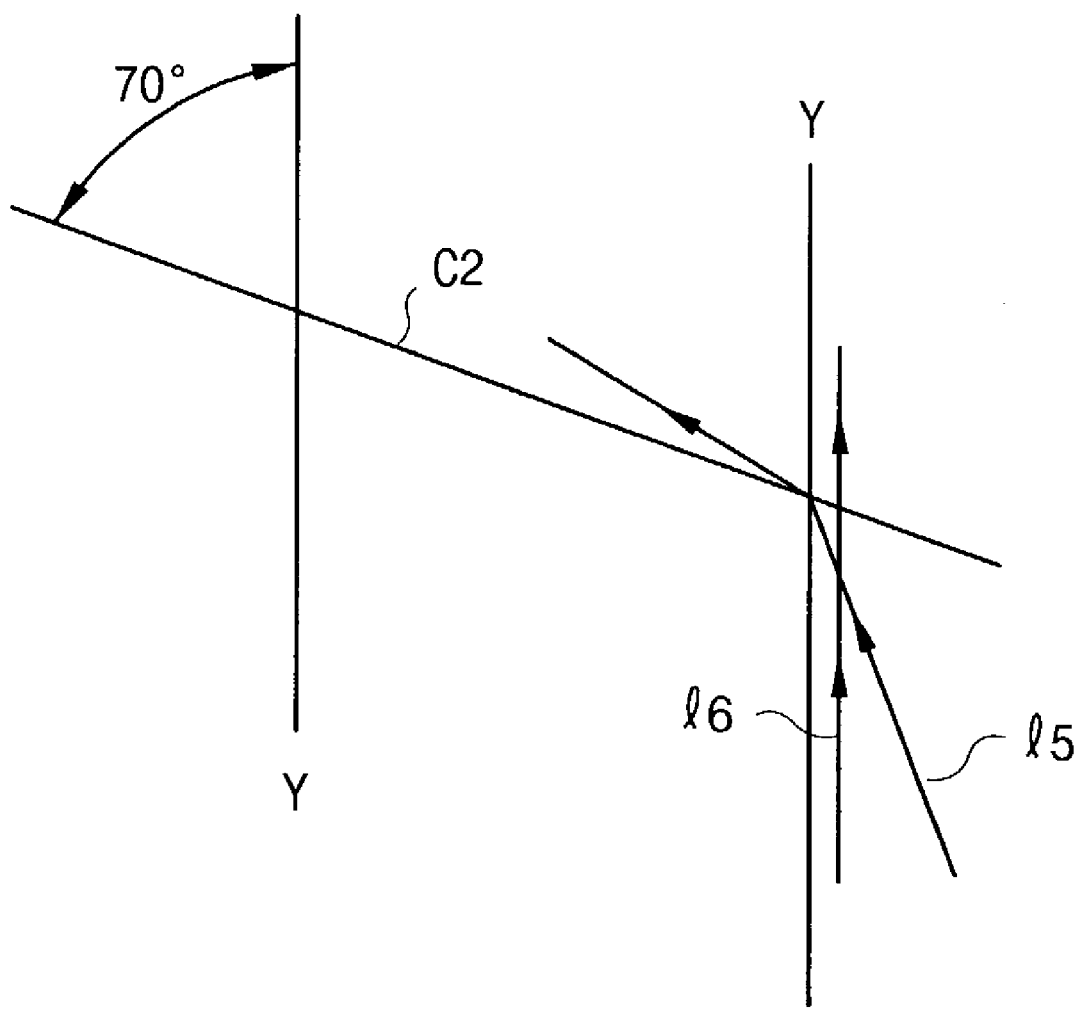

FIGS. 10A and 10B are sectional conceptual views for illustrating operations of the prism sheets shown in FIGS. 5 to 8, in particular FIG. 10A is a conceptual view illustrating the case where light is incident on the left side of the prism 50 and FIG. 10B is a conceptual view illustrating the case where light is incident on the right side of the prism 50.

Referring to FIG. 10A, beams 1 to 4 travel from the left side of the figure and each strikes an incline plane C2 having an angle of 70° with respect to the normal line (Y). The beams 2, 3, and 4 that are incident with an angle that is greater than approximately 2.8° are refracted at an incline plane (C2) of the protruding member due to a difference between the refractive indices of the protruding member and air, so that these light beams are emitted. As for the beam 1 that is incident at an angle of approximately 2.8°, it is also refracted at an incline plane C2 and is emitted.

Referring to FIG. 10B, beams 5 and 6 strike a side having an angle of approximately 70° with respect to the normal line Y from the right side of the figure. Of these beams 5 and 6, the beam that is incident with an angle greater than 2.8° with respect to the normal line Y is refracted at the incline plane (C2) due to the difference in the indices of refraction of protruding member and air, so that it is emitted. The incline plane C2 may be, for example, the first side e1 of FIG. 6 or the second side e3 of FIG. 7.

As described above, while the incident light into the prism sheet is emitted with refraction at the incline plane C2 of the protruding member, the prism sheet of the present invention having an improved protruding member permits even the beam that is incident with an angle of less than 2.8° not to be reflected at the incline plane of the protruding member but to be refracted at the incline plane of the protruding member instead so that it can be emitted. Hence, compared with the conventional prism sheet, the prism sheet of the present invention permits a greater portion of incident light to be emitted, so that light extraction efficiency is enhanced.

Figure 11:
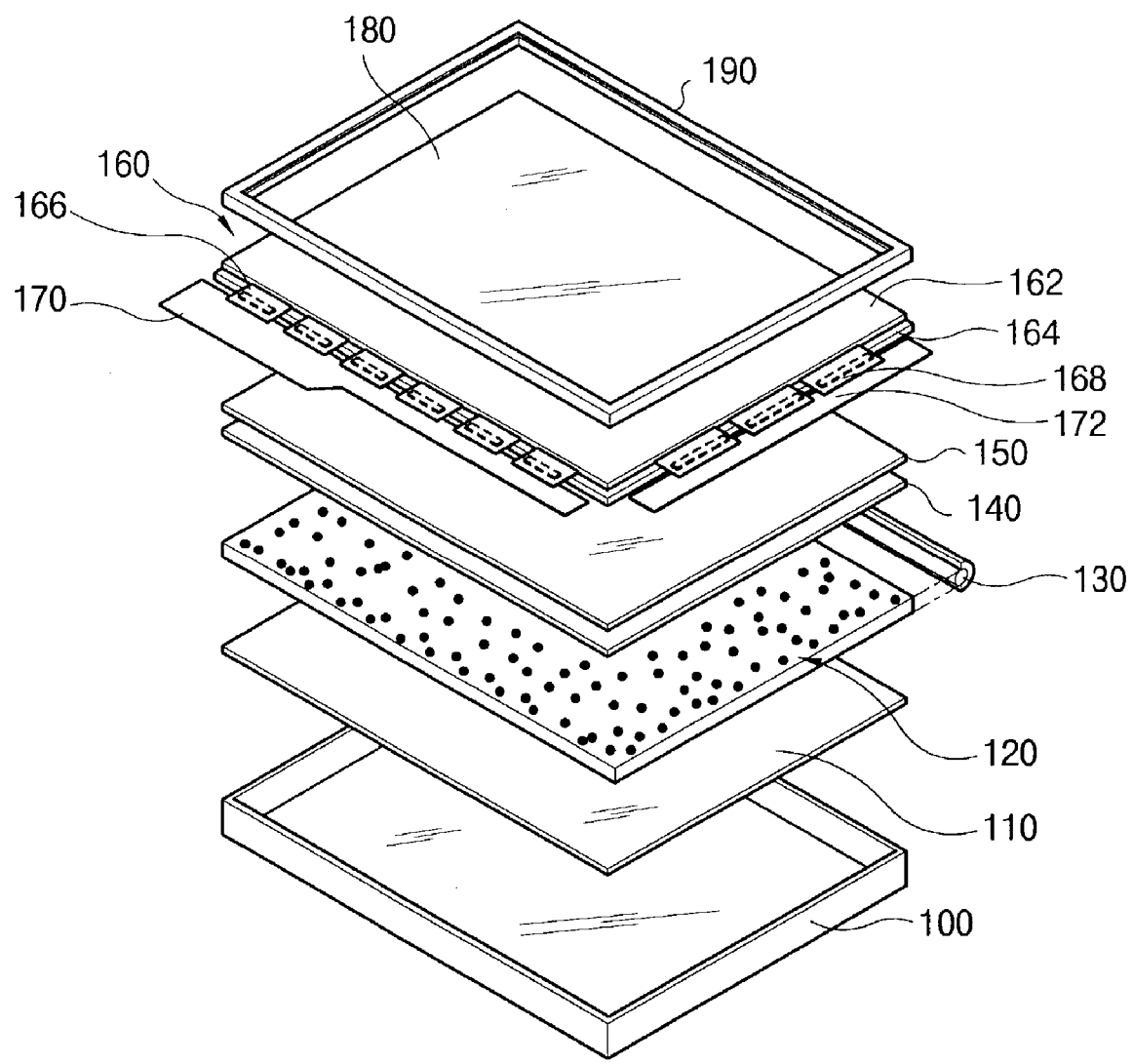
FIG. 11 is a disassembled perspective view of an LCD device to which the prism sheets shown in FIGS. 5 to 8 are applied.

FIG. 11 is a disassembled perspective view of an LCD device that includes a prism sheet of the present invention.

Referring to FIG. 11, a liquid crystal display device of the present invention includes a diffusion plate 140 for diffusing a light that is emitted from a backlight source 130 and incident through a light guiding plate 120 and an underlying reflecting plate 110, a prism sheet 150 for shortening a viewing angle of the light that is incident from the diffusion plate 140, a polarizing plate (not shown) for polarizing the light passing through the prism sheet 150 to form a polarized light, and an LCD panel 160 for displaying an image using the polarized light from the polarizing plate. In FIG. 11, numeral 100 represents a lower case, numeral 110 the reflecting plate 110, numeral 162 a color filter substrate, numeral 164 a TFT substrate, numeral 166 a data PCB, numeral 168 a gate PCB, numeral 180 an upper polarizing plate, and numeral 190 an upper case, respectively. As these components are well known, a person of ordinary skill in the art would understand the functions and the compositions of each of these components.

Figure 12:
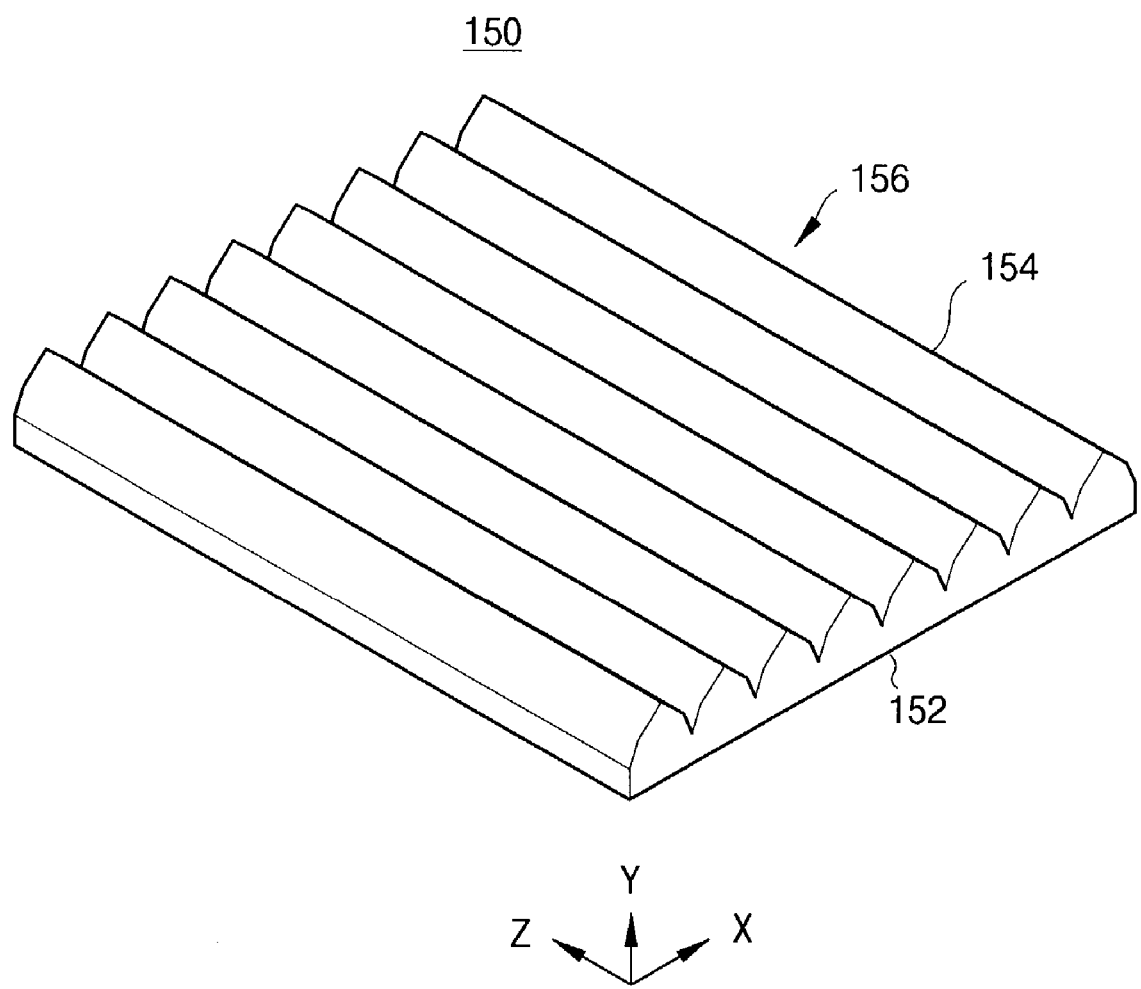
FIG. 12 is a perspective view of a prism sheet employed in FIG. 11.

The prism sheet 150, as shown in FIG. 12, includes the first surface 152 that is a light incident surface into which light is incident from the diffusion plate 140, and the second surface 154 which is back to back with the first surface 152 and has a plurality protruding members 156, and through which the light that is incident through the first surface 152 is emitted. Each of the protruding members 156 is arranged substantially in parallel with each other along one direction (X-direction).

Referring to FIG. 12, the protruding members 156 include a polygonal structure having at least five sides. The cross sectional view of the polygonal structure of FIG. 12 may look like the cross sectional view shown in FIG. 6. Referring to FIG. 6, an angle (C) between the normal line (Y) of the first surface 52 and each of first two sides (e1 and e2) that are placed adjacent to the uppermost apex ranges from 65° to 75°, and is preferably about 70°. As aforementioned, these angles correspond to a range in which light that is incident on the incline surfaces of the respective protruding members with an angle less than 2.8° with respect to the normal line is emitted. Second sides (e3 and e4) adjacent to the first sides (e1 and e2) have an angle (D) ranging from approximately 40° to 60° with respect to the normal line (Y) of the first surface 52.

Alternatively, as shown in FIG. 7, the protruding member has more sides than a pentagon. Specifically, a first side e1 that is adjacent to the uppermost apex P has an angle C of approximately 40° to 60° with respect to the normal line (Y) of the first surface. As aforementioned, these angles correspond to a range in which a light that is incident on the incline surfaces of the respective protruding members with an angle below 2.8° with respect to the normal line is emitted. The second side (e3) adjacent to the first side (e1) has an angle (D) ranging from approximately 65° to 75°, and preferably about 70°, with respect to the normal line (Y) of the first surface.

Also, as shown in FIGS. 8 and 9, the protruding member of the prism sheet applied to the LCD device of the present invention includes at least two sides (e3 and e7) having an angle (D, E) ranged from approximately 65° to 75° with respect to the normal line (Y), and these sides (e3 and e7) preferably form an angle of 70° with respect to the normal line (Y). Likewise, these angles correspond to a range in which a light that is incident into the incline surfaces of the respective protruding members with an angle below 2.8° with respect to the normal line is emitted.

Figure 13:
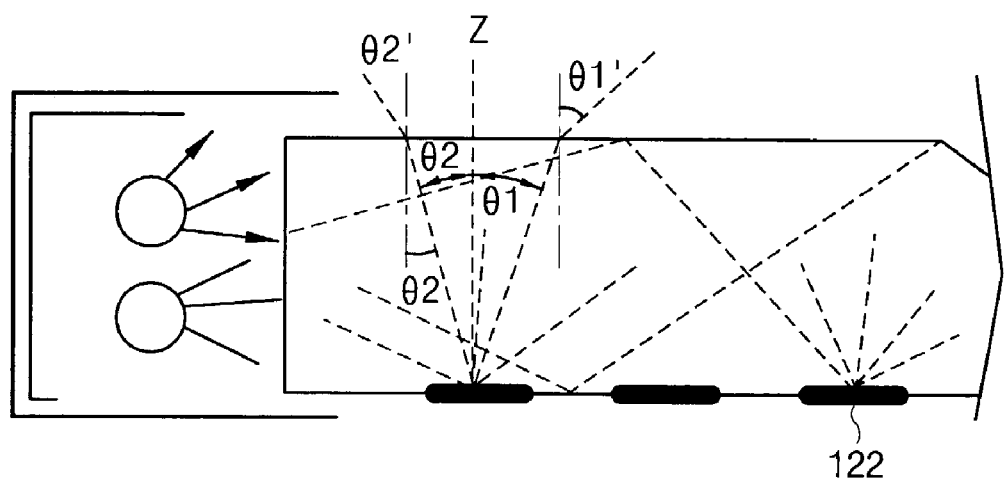
FIG. 13 is a schematic view for illustrating light behavior in the light source and the light guiding plate in the LCD device of FIG. 11 to which the prism sheet of FIG. 12 is applied.

FIG. 13 is a schematic view for illustrating light behavior in the light source and the light guiding plate in the LCD device of FIG. 11.

Referring to FIG. 13, when considering that the refractive index of the light guiding plate 120 is 1.49, light that is emitted from a lamp 132 of the backlight source 130 and is incident into the light guiding plate 120 is totally reflected, but light that passes through the inside of the light guiding plate 120 is reflected by a printed pattern or a groove 122 and is emitted through the upper surface of the light guiding plate 120. In other words, only the light corresponding to a total reflection angle range in the incident light of the light guiding plate 120 is emitted.

When the refractive index of air, Na is 1.0 and the refractive index of the light guiding plate, Ng is 1.49, a sine value of the total reflection angle ($\theta$) is the same as a ratio of the refractive index of air to the refractive index of the light guiding plate, e.g., $\sin\theta = Na \div Ng \approx 0.67114$. Accordingly, the total reflection angle $\theta$ is about 42.155°. Hence, when the light that is incident into the light guiding plate 120 has a total reflection angle within 42.155°, it is emitted outside the light guiding plate 120.

Figure 14:
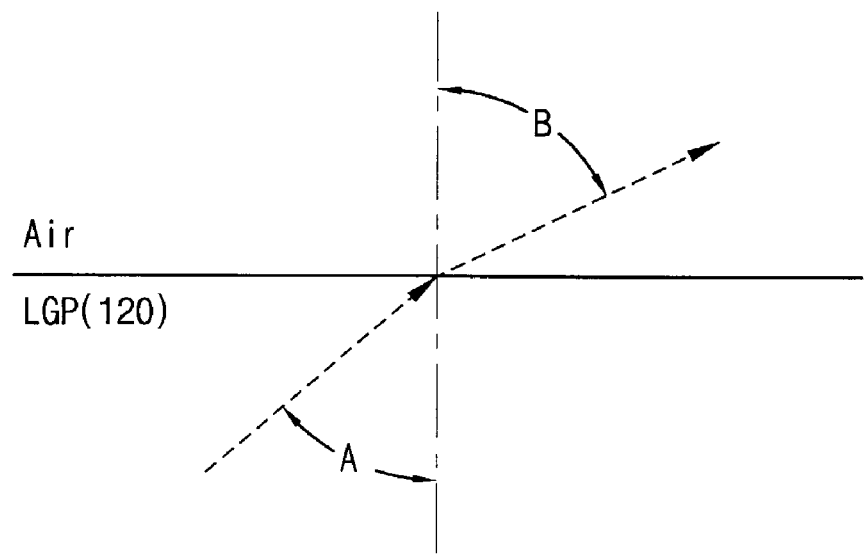
FIG. 14 is a schematic view for illustrating variation in irradiating angles of light between the light guiding plate and the overlying air in the LCD device of FIG. 11.

FIG. 14 is a schematic view illustrating variation in emissive angles of light between the light guiding plate 120 and the overlying air in the LCD device of FIG. 11.

The following table 1 shows variations in the light emissive angle (B) of when the light incident angle (A) is varied with respect to the normal line (Y) of the emissive surface.

TABLE 1

| Incident angle "A" | Emissive angle "B" |
|---|---|
| 10° | ≈14.99° |
| 20° | ≈30.63° |
| 30° | ≈48.15° |
| 40° | ≈73.28° |

As will be seen in table 1, as the incident angle in the light guiding plate 120 increases to a critical angle (A≈42.155° or about 42.155°), the light emissive angle increases too. 94.9% of the light that is incident with the critical angle (≈42.155°) has a light emissive angle of 73.28°.

Figure 15:
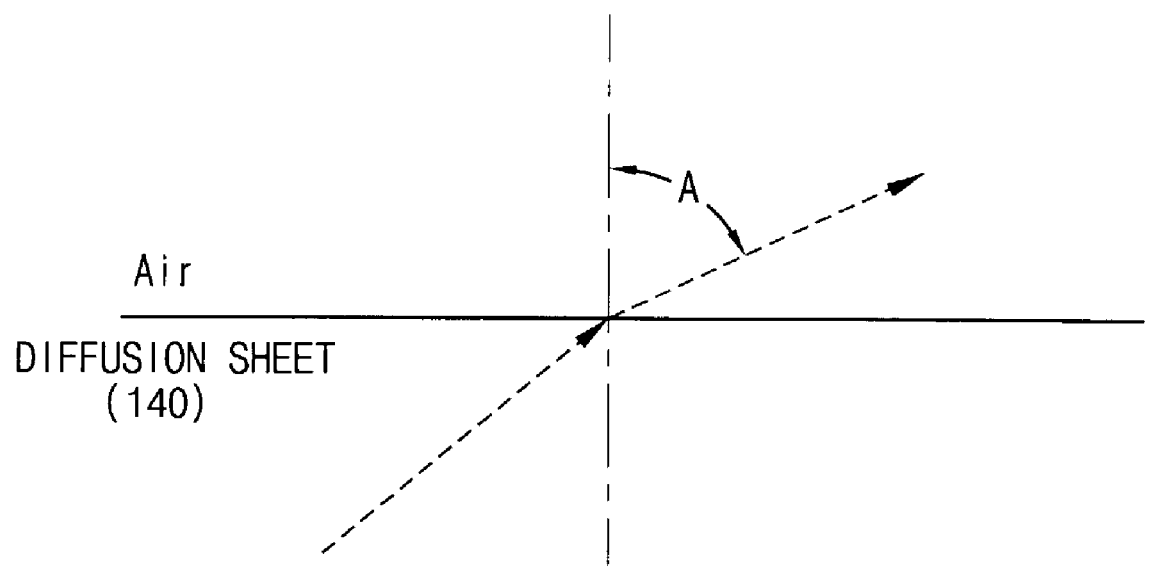
FIG. 15 is a schematic view for illustrating variation in irradiating angles of light between the light diffusion plate and the overlying air in the LCD device of FIG. 11.

FIG. 15 is a schematic view illustrating variation in irradiating angles of light between the light diffusion plate 140 and the overlying air in the LCD device of FIG. 11.

The following table 2 shows distributed ratios of the light emissive angle (A) with respect to the direction of the normal line of the light emissive surface, and corresponds to results measured using a backlight unit applied to LCD devices having a screen size of 15.3 inches that is a mass production model of Samsung electronics.

TABLE 2

| (i) | |
|---|---|
| Emissive angle "B" | Distributed ratio |
| 0–34° | ≈55.5% |
| 34–50° | ≈20.38% |
| 50–60° | ≈9.02% |
| 60–70° | ≈7.7% |
| 70–80° | ≈7.4% |

Figure 1:
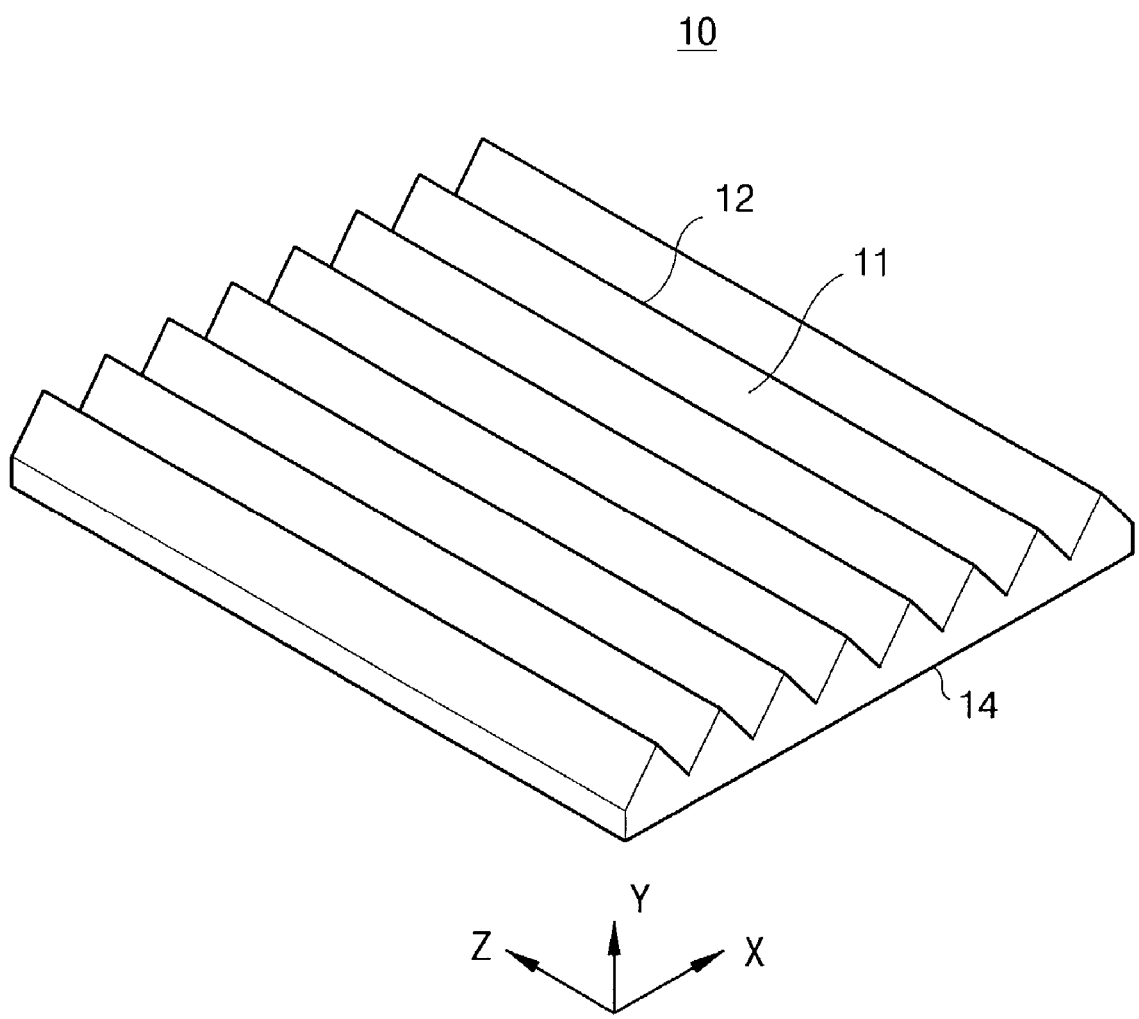
FIG. 1 is a perspective view of a prism sheet in accordance with the conventional art.
Figure 2B:
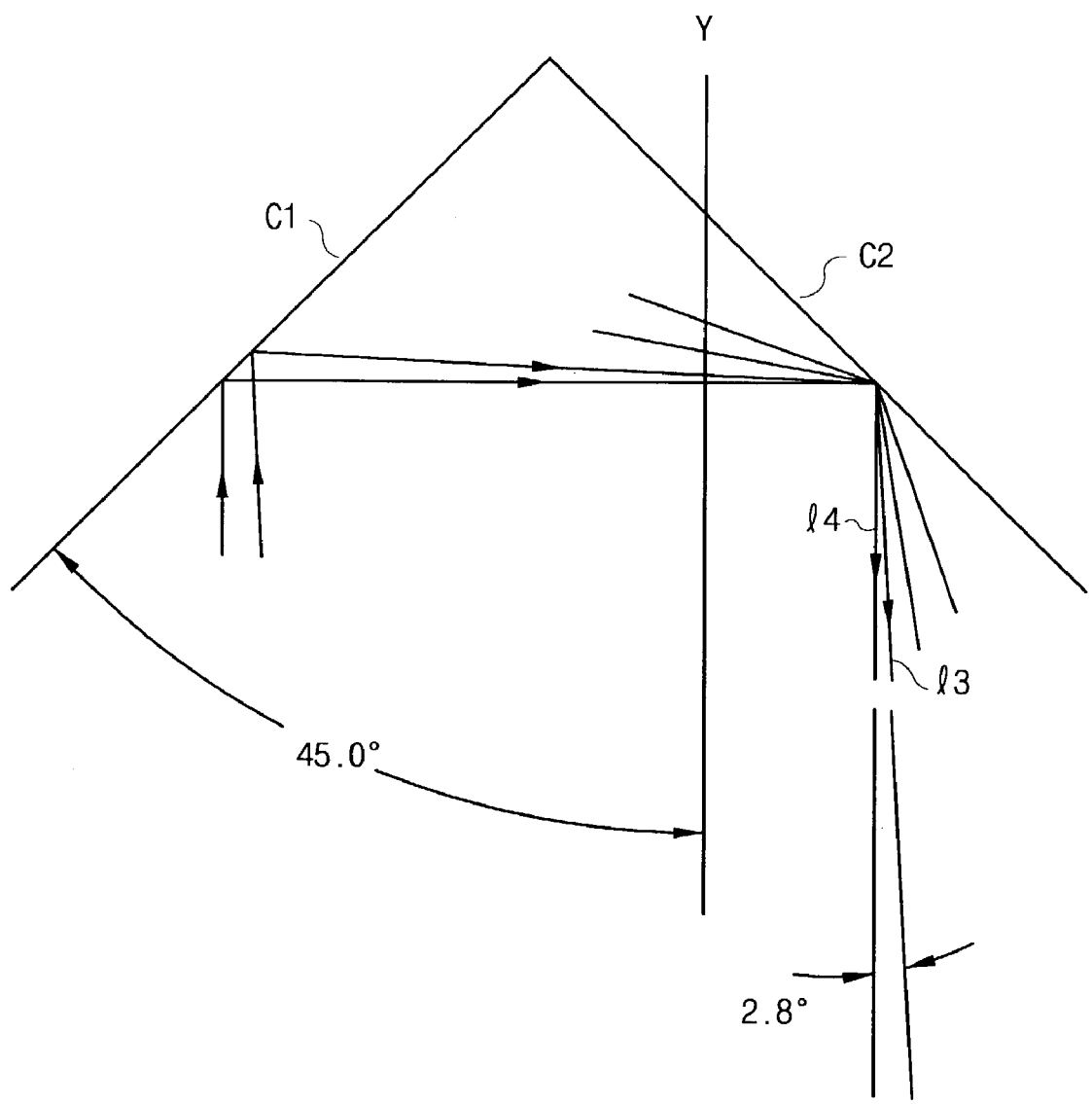
Figure 3:
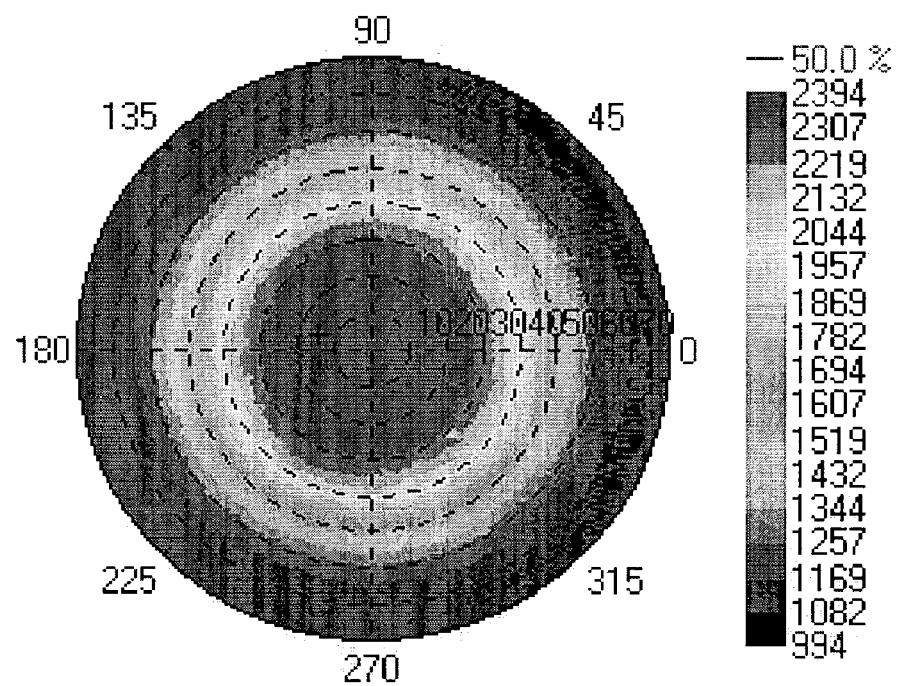
FIG. 3 is a view showing a measurement result of luminance distribution of light passing through the diffusion plate in the conventional LCD device.
Figure 3:
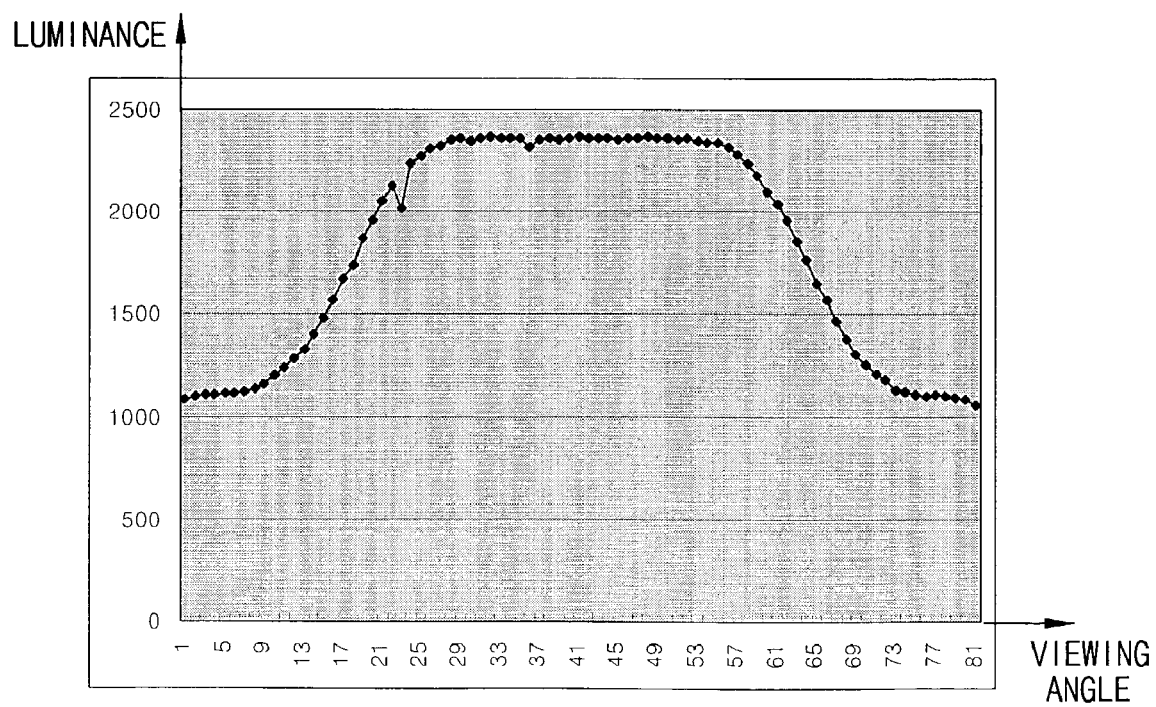
Figure 4:
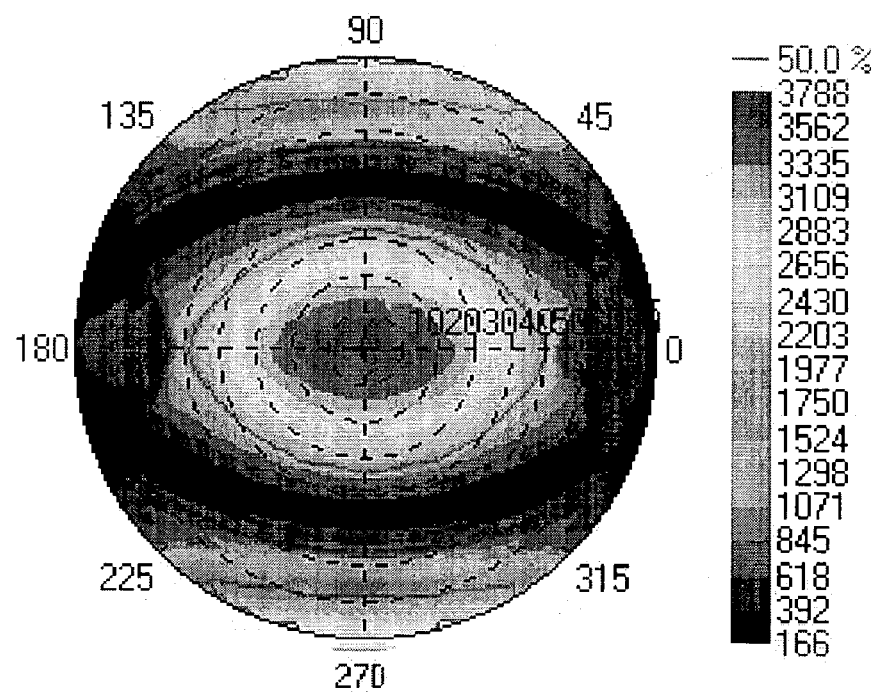
FIG. 4 is a view showing a measurement result of luminance distribution of light passing through the prism sheet in the conventional LCD device.
Figure 4:
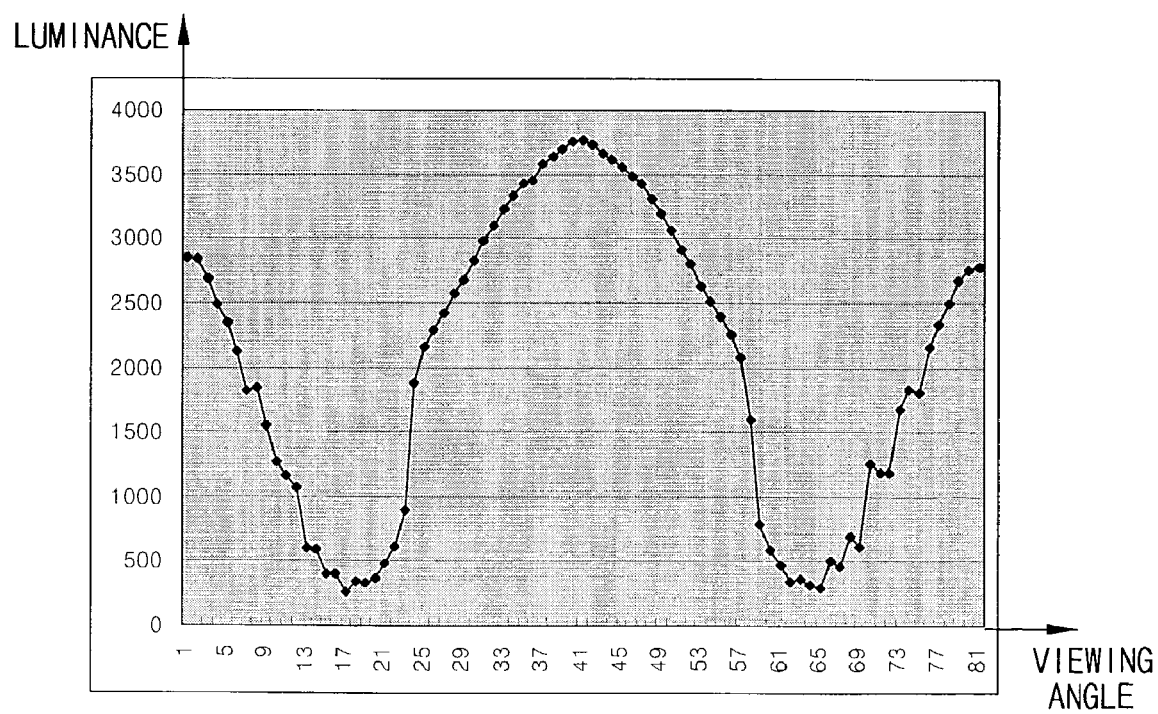

As will be seen in table 2, the light having the emissive angle of 0-34° has a distributed ratio of 55.5% that is the highest value, and the light having the emissive angle of 34-50° has a distributed ratio of 20.3% that is the second highest value. This result means that most of light is incident into the prism sheet with the emissive angle range of 0-50°. Also, this result accords with the measured values shown in the graph of FIG. 3.

In addition, this result means that a considerable amount of light is incident with an angle within 2.8° with respect to the normal line (Y) in the prism sheet.

As aforementioned, since the prism sheet of the present invention has the protruding member of which incline plane has a side with an angle of 65-75° with respect to the normal line (Y), a selected amount of the light that is incident with the angle within 2.8° is refracted and is then emitted outside the prism sheet. By nature of the polygonal structure, it is impossible to allow all sides with respect to the normal line to have an angle range of 65-75°. To this end, it is inevitable that the light that is incident with an angle within 2.8° is partially reflected by the protruded surface of the prism sheet. Hence, in case the section of the prism sheet is made to have a pentagonal structure, it is desirous that an overall length of sides having an angle range of 65-75° with the respect to the normal line direction among four sides that are placed adjacent to the uppermost apex is made as long as possible.

In addition, as shown in FIGS. 8 and 9, in case the two sides that are placed adjacent to the uppermost apex is made in a structure of sawtooth, the overall length of the sides having the aforementioned angle range of 65-75° is properly selected with respect to the total length of all sides.

In other words, as an overall length of a side that has an angle smaller than the angle range of 65-75° increases, the ridge width of the protruding member decreases, and as an overall length of sides belonging to the angle range of 65-75° increases, the ridge width of the protruding member increases, e.g., an angle ($\alpha$) between two sides of the sawtooth increases.

This, upon considering prism sheet having the same area, means that the number of the protruding members in the latter case becomes smaller than that in the former case. Then, if the angle of the protruding member is too small, it is difficult to fabricate the prism sheet along with the aforementioned deterioration of the optical properties. Hence, it is desirous that an overall length of the sides having the angle range of 65-75° increases.

As described previously, the prism sheet of the present invention allows light that is incident with an angle below approximately 2.8° with respect to the light incident surface not to be reflected by an upper inclined plane but to be refracted and emitted, thereby preventing the luminance from being lowered and enhancing the efficiency of the incident light.

Also, the prism sheet of the present invention can be applied to an LCD device, and enhances the utilization efficiency of the incident light by decreasing the amount of the light reflected within the prism sheet without increasing the power supply.

Further, in case the LCD device is applied to portable electronic appliances requesting a high luminance, such as a notebook computer, there is no need which a separate power is supplied, so that use time of the portable electronic appliances can be extended.

While the present invention has been described in detail, it should be understood that various changes, substitutions and alterations can be made hereto without departing from the spirit and scope of the invention as defined by the appended claims.

What is claimed is:

1. A prism sheet comprising:
    a first surface through which light from a light source that is disposed below the first surface enters the prism sheet; and
    a second surface through which the light exits the prism sheet, wherein the second surface includes prisms extending substantially parallel to one another continuously across the second surface, each of the prisms having a cross-section including sides that are arranged symmetrically about an apex with respect to a virtual normal line that is normal to the first surface, wherein the second surface is opposite to the first surface, and wherein a number of the sides of the second surface is at least four, and two of the symmetric sides meet at the apex,
    wherein the sides of the prisms comprises:
    a plurality of first sides forming a first angle that ranges from 65° to 75° with respect to the virtual normal line to refract light having an incident angle of less than about 2.8° with respect to the virtual normal line; and
    a plurality of second sides forming a second angle that ranges from about 40° to about 60° with respect to the virtual normal line, wherein the first sides and the second sides are alternately connected to each other.

2. The prism sheet of claim 1, wherein the symmetric sides that meet at the apex are two of the first sides.

3. The prism sheet of claim 2, wherein the number of the first sides is equal to four or more than four in each prism.

4. The prism sheet of claim 1, wherein the number of the second sides is equal to four or more than four in each prism.

5. The prism sheet of claim 1, wherein a length sum of the first sides is greater than a length sum of the second sides.

6. The prism sheet of claim 1, wherein the symmetric sides that meet at the apex are two of the first sides.

7. A liquid crystal display device comprising:
    a prism sheet for receiving light; and
    a liquid crystal display panel for displaying an image using the light from the prism sheet,
    wherein the prism sheet comprises a first surface through which light from a light source that is disposed below the first surface enters the prism sheet and a second surface through which the light exits the prism sheet, and the second surface includes prisms extending substantially parallel to one another continuously across the second surface, each of the prisms having a cross-section including sides that are arranged symmetrically about an apex with respect to a virtual line that is normal to the first surface, wherein the second surface is opposite to the first surface, and wherein a number of the sides of the second surface is a least four, and two of the symmetrical sides meet at the apex,
    wherein the sides of the prisms comprises:
    a plurality of first sides forming a first angle that ranges from 65° to 75° with respect to the virtual normal line to refract light having an incident angle of less than about 2.8° with respect to the virtual normal line; and
    a plurality of second sides forming a second angle that ranges from about 40° to about 60° with respect to the virtual normal line, wherein the first sides and the second sides are alternately connected to each other.

8. The liquid crystal display device of claim 7, wherein the symmetric sides that meet at the apex are two of the first sides.

9. The liquid crystal display device of claim 8, wherein the number of the second sides is equal to four or more than four in each prism.

10. The liquid crystal display device of claim 8, wherein the number of the first sides is equal to four or more than four in each prism.

11. The liquid crystal display device of claim 7, wherein a sum length of the first sides is greater than a length sum of the second sides.

12. The prism sheet of claim 7, wherein the symmetric sides that meet at the apex are two of the first sides.

* * * * *